Nov. 24, 1925.
A. Y. DODGE
1,562,822
VEHICLE BRAKE SHOE CARRIER PLATE AND BRACKET MECHANISM THEREFOR
Filed March 22, 1924     4 Sheets-Sheet 3
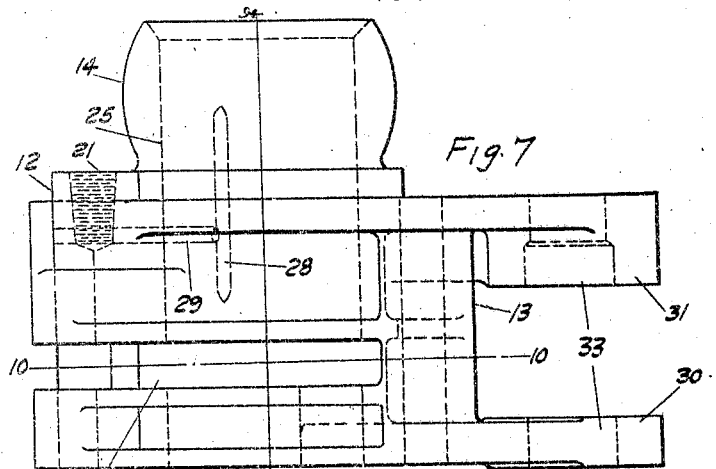
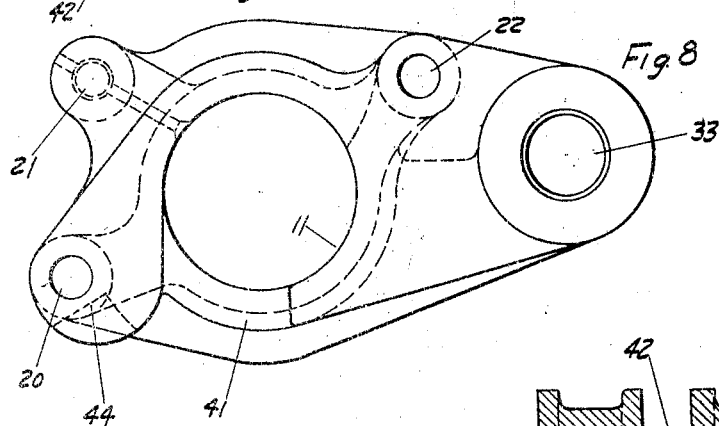
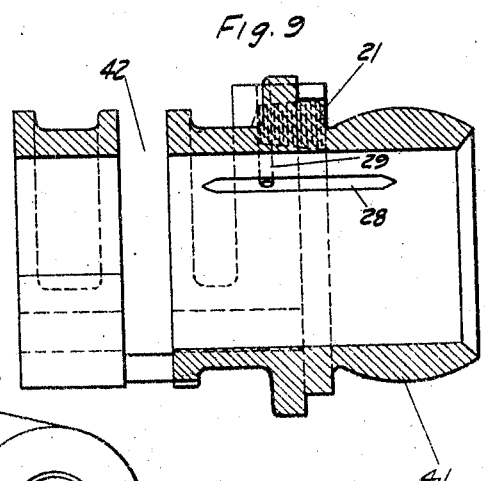
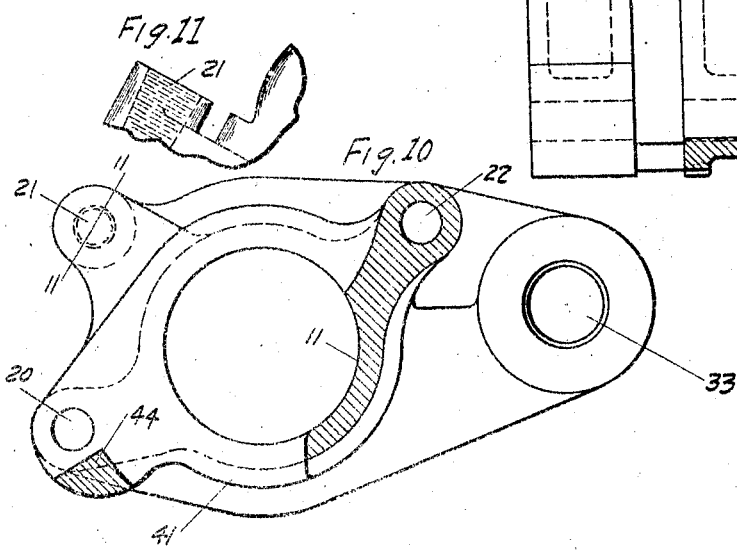
INVENTOR
ADIEL Y. DODGE
BY
ATTORNEY

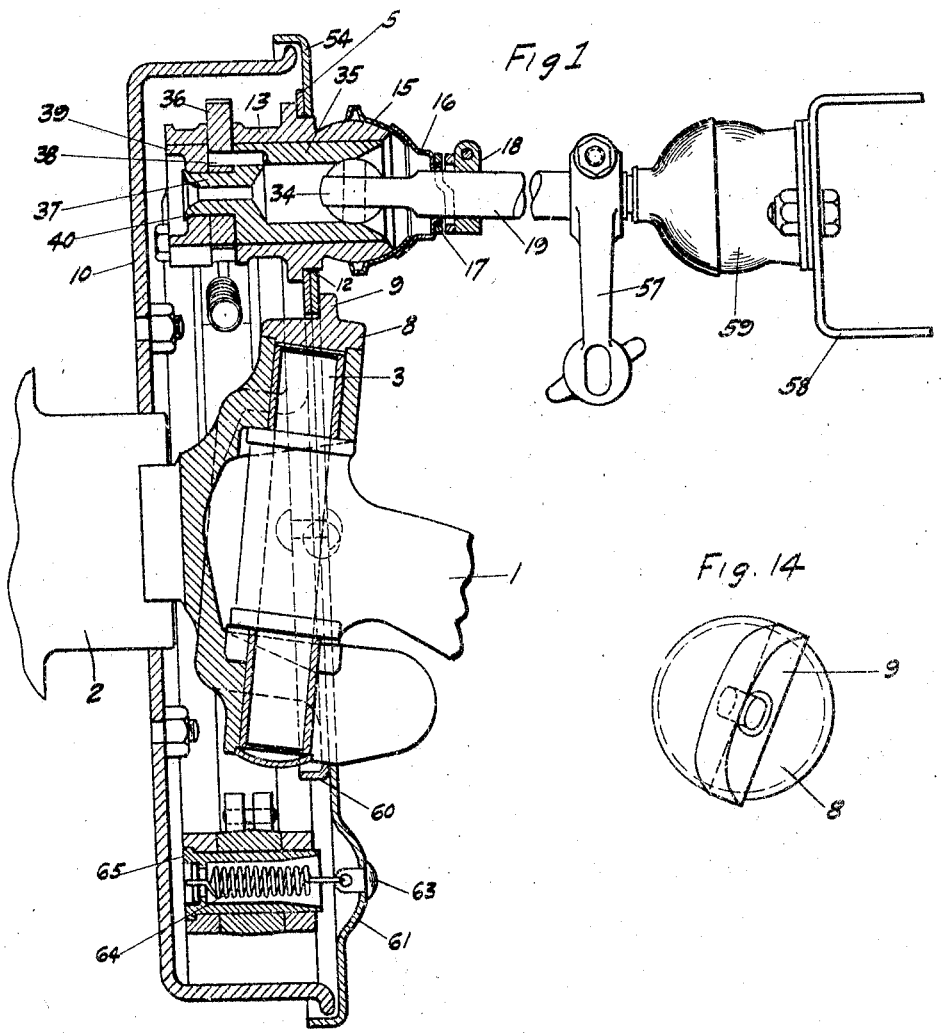

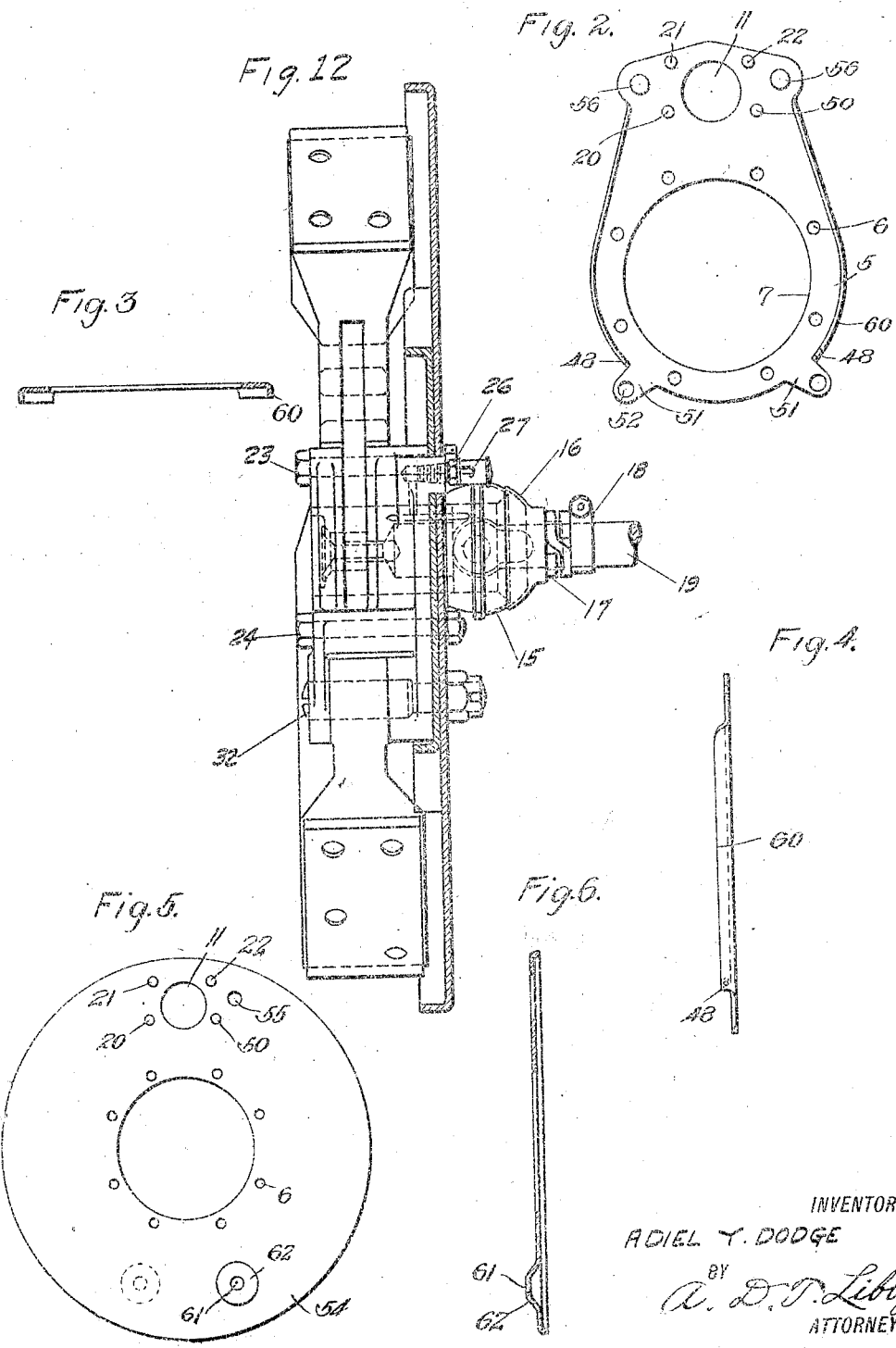

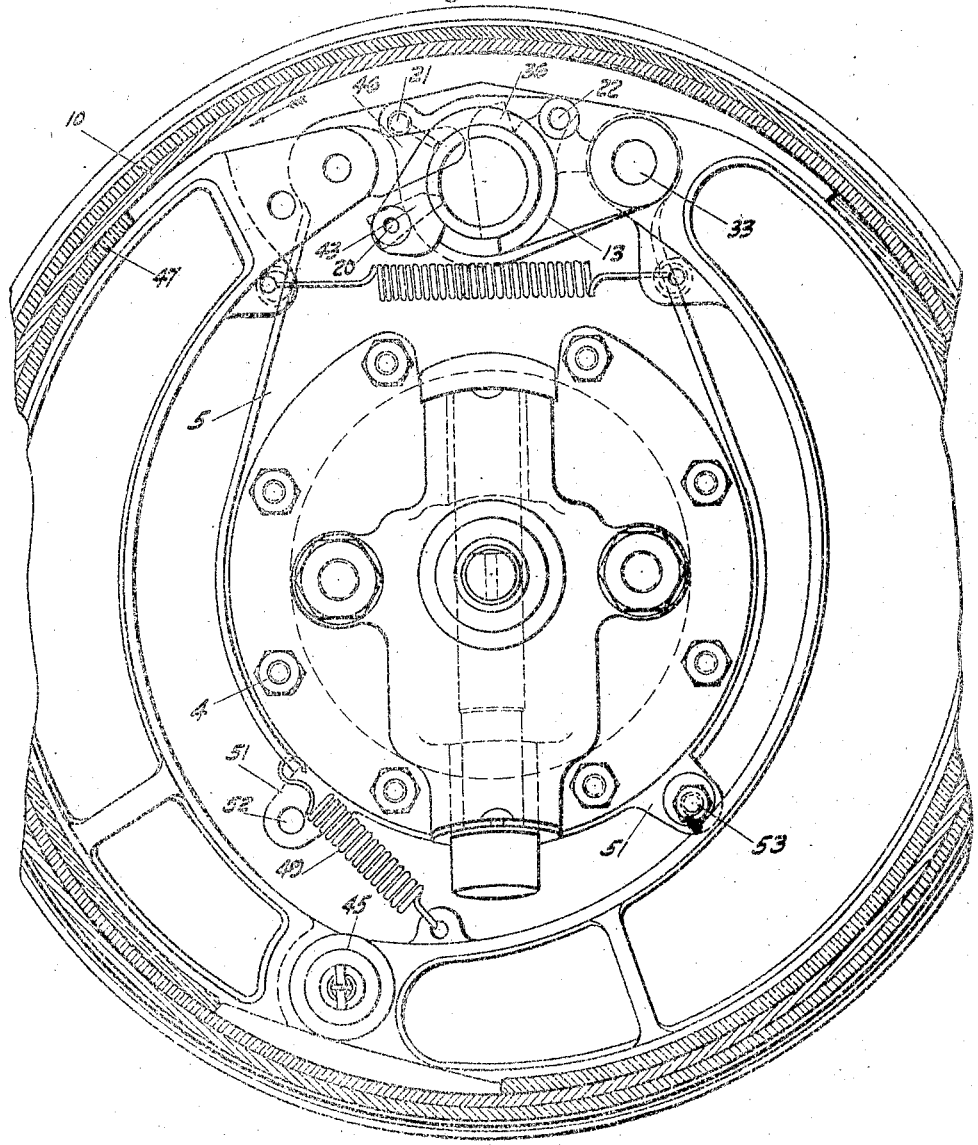

Patented Nov. 24, 1925.

1,562,822

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

VEHICLE BRAKE-SHOE CARRIER PLATE AND BRACKET MECHANISM THEREFOR.

Application filed March 22, 1924. Serial No. 704,173.

*To all whom it may concern:*

Be it known that I, ADIEL Y. DODGE, a citizen of the United States, residing at South Bend, in the county of St. Joseph, State of Indiana, have invented certain new and useful Improvements in Vehicle Brake-Shoe Carrier Plates and Bracket Mechanism Therefor, of which the following is a description, reference being had to the accompanying drawing, and to the figures of reference marked thereon.

This invention relates to improvements in front wheel brake control mechanism. In the well-known Perrot system of front wheel brake control, there is provided a control shaft, one end of which is attached to a nonrotatable part of the vehicle, such as the chassis frame, and the other end is arranged to actuate a cam or cam shaft which in turn operates the brakes, usually of the internal expanding type, and my invention is directed to improvements in the said Perrot system by the introduction of certain novel features.

It is well known that in the manufacture of metal parts, stampings from sheet metal are among the strongest and the least expensive to produce. Furthermore screw machine parts, which must be used and which can be produced from bar stock on automatic screw machines, are likewise inexpensive for this class of parts.

Therefore, some of the objects of my invention may be stated as follows: to provide strong and durable means for mounting and actuating the brake shoes of the front wheels of an automotive vehicle, which means consist of a minimum number of parts, all being simple and easy to manufacture; and to provide a design which will be adaptable for both right and left wheels.

These and other objects will be clear to one skilled in this art after a study of the specification and the drawings annexed hereto.

Figure 1 is a vertical sectional view through a wheel drum and part of the spindle and brake mechanism, showing also the outer support for the brake control shaft.

Figure 2 is a view on a reduced scale of the brake carrier plate.

Figure 3 is a top view of Fig. 2.

Figure 4 is a side view of Fig. 2.

Figure 5 is a view of the cover plate which closes in the drum opening.

Figure 6 is a side view of Fig. 5.

Figure 7 is a plan view of the carrier bracket.

Figure 8 is an end elevation of Fig. 7.

Figure 9 is a section on the line 9/9 of Fig. 7.

Figure 10 is a section on the line 10/10 of Fig. 7;

Figure 11 being a fragmentary detail on the line 11/11 of Fig. 10.

Figure 12 is a plan view showing the carrier bracket plate and bracket and other parts in operative position.

Figure 13 is a side elevation of the left wheel of the vehicle looking from the wheel side, the wheel side of the drum being cut away.

Figure 14 is a perspective view of the cap covering the king pin.

Referring now to the drawing wherein like numbers refer to corresponding parts in the various views, 1 is an axle beam to which the axle spindle 2 is connected by means of the pivot pin 3. The axle end of the spindle 2 is formed with a flat surface to which is bolted by a suitable number of bolts 4, a carrier plate 5 preferably made of strong sheet metal, such as steel, holes 6 being provided therein for these bolts. The carrier plate 5 is perforated or is provided with a large orifice bounded by the line 7, which is the line that fits around the axle end of the spindle 2. Over the pivot pin 3 a cap 8 is provided, which has an arcuately shaped flange 9 that closes off the opening into the cavity formed within the brake drum 10 at the point where the carrier plate 5 passes around the boss containing the upper end of the pivot pin 3. The carrier plate projects upward above the axle and spindle and in its upper portion has an orifice 11 to receive the dowel portion 12 of the carrier bracket 13. Bracket 13 has an arcuately formed projecting part 14 on which is adapted to move a protecting cover 15 which is associated with a cap 16 held in operative position by means of a resilient member 17 and a locking device 18 carried on the control shaft 19, that is actuated by the lever 57, the outer end of the shaft 19 being supported to the side of the chassis 58 by means of a ball and slip joint indicated by 59. It is to be understood that the cover 15 and cap 16 have an oscillatory movement over the end 14 as the wheel and chassis of the vehicle move.

In order to securely fasten the bracket 13 in the hole 11 of the carrier plate 5, holes 20, 21 and 22 are provided. The corresponding holes in Fig. 2 are given the same numbers to show that the fastening bolts which pass through the carrier bracket pass through corresponding holes in the carrier plate. The bolt which passes through the holes 20 in both the bracket and the carrier plate is indicated in Fig. 12 by the numeral 23, while the bolt 24 passes through the holes 22. Instead of a through bolt going all the way through the carrier bracket, I have utilized one of the bolt holes for a special purpose, namely that of passing lubricant to the interior bore 25 in the bracket 13. This is accomplished by threading the hole 21 and screwing therein an adaptor 26 which carries a lubricating cup 27. The adaptor 26, therefore performs the double function of acting as a set screw in clamping the bracket to the carrier plate 5, as well as a carrier member for the lubricating cup 27. A groove 28 is provided in the interior surface of the bore 25 and a passage 29 leads from the groove 28 to the tapped hole 21.

The carrier bracket 13 is provided with two substantially parallel arms 30 and 31 having a hole 33 therein. Between these arms and on a bolt 32 (see Fig. 12) fitting in hole 33 is pivotally mounted one end of the brake shoe of the Perrot type, shown more in detail in Fig. 13, and which will be referred to later on.

Within the bore 25 of the carrier bracket is supported a universal joint mechanism 34, one member of which includes a camshaft 35, the nose of the cam 36 protrudes through the wall of the bracket. The cam 36 is mounted on the end 37 of the camshaft 35, being held in position by any suitable means, such as an anchor pin 38 and a bearing collar 39 which in turn is held in position by having the metal of the camshaft spun over at 40. These particular details of the universal joint and cam shaft form the subject matter of another application and will, therefore, not be referred to in detail herein except to point out that after the cam has been assembled to the camshaft 35 in the manner just briefly described, it is assembled in the carrier bracket 13 through the medium of an opening 41, which forms an entrance for the cam which projects outwardly from the shaft 35. After the cam is then passed through the opening 41 the cam shaft is revolved so the cam passes into the slot 42, after which the cam stop 43 (see Fig. 13) is put in place and the bolt 20 inserted after the carrier bracket has been put in position on the carrier plate 5. The stop 43 rests against the lip 44, both of which act to prevent the cam 36 from being turned more than a fixed amount, as will be clearly indicated by reference to Fig. 13 in which is shown a self-wrapping servo-brake of the Perrot-Farnam type, wherein the brake consists of two members pivoted together at the floating joint 45. One of these members is pivoted by the bolt 32 as already described, and the other member carries a cam engaging member 46 preferably of hardened steel. These brake shoe members carry a friction covering 47 which is brought into engagement with the inner part of the brake drum 10 on actuation of the cam 36. The construction and operation of this type of brake forms the subject matter of another application and will, therefore, not be further described herein except to mention that the carrier plate 5 has holes 48 in the turned over strengthening rim 60 of the plate to receive one end of the brake control spring 49.

It will be noted in Fig. 2 that there are two holes 48 on opposite sides of the plate 5, also an extra hole 50 is provided together with two ears 51 with holes 52 therein, whereby plate 5 can be used on either the right or left hand wheel. The holes 52 in the ears 51 are used for the reception of an eccentric stop for regulating the clearance of the brake shoes with respect to the drum 10. The eccentric is turned from the outside and locked by the nut 53. In order to close off the opening into the drum, I have provided a cover plate 54 having the same corresponding holes 6 as in the carrier plate, the same bolts being used to hold both the cover plate and carrier plate in position. Corresponding holes 20, 21, 22, 50 and 11 are provided for the bolts that secure the carrier bracket 13 to the carrier plate. Likewise a hole 55 is provided to operate with either of the holes 56 in the carrier plate that takes the brake pivot bolt 32. The cover plate 54 fits around the axle, spindle and the cap 8 in the same manner as the carrier plate and both plates substantially take up the dowel space 12 on the carrier bracket, as clearly indicated in Fig. 1.

The cover plate 54 has a boss 61 and a hole 62 therein. This boss with the arrangement of braking members shown is somewhat off the vertical center line and, therefore, is preferably formed separately after the cover has been punched including all of the holes previously referred to, except the one through the boss itself. The position of the boss and hole for one wheel is indicated in full lines and for the other wheel it is indicated in dotted lines. The hole 62 takes an eyelet 63 used for engaging one end of retaining spring 64 that is used in conjunction with a bushing 65 to hold the braking members from lateral displacement. The bushing 65 acts to form with the braking members the floating pivot 45 heretofore referred to.

It will be seen that I have provided a carrier bracket all in one piece, which takes the place of several pieces heretofore used, and this bracket forms an anchorage for the brake shoes, as well as a bearing for the camshaft which actuates the brake, and also provides a suitable bearing in connection with the dust cap, a housing for the universal joint, and acts also to retain all of the universal joint parts in proper operative relationship. It will be clearly seen that numerous changes may be made in the details for carrying out my invention and I, therefore, do not wish to be limited to the precise construction shown and described, except as limited by the scope of the appended claims.

Having thus described my invention, what I claim is:

1. In combination with a vehicle wheel having a brake drum and a spindle supported by an axle, a carrier plate fitting around and fastened to the axle end of the spindle and extending above the spindle, a bracket fastened to said extended portion of the plate and having a part protruding through the plate beyond the drum, a universal joint including a shaft with a cam attached thereto housed within said bracket, braking means, housed within the drum and adapted to act thereon, pivoted to said bracket so as to be actuated by said cam, and a cover plate lying over the carrier plate for closing off the drum opening.

2. In combination with a vehicle wheel having a brake drum and a spindle supported by an axle, a carrier plate fitting around and fastened to the axle end of the spindle and extending above the spindle, a bracket fastened to said extended portion of the plate and having a part shouldered against the plate and protruding through it, a universal joint including a shaft with a cam attached thereto housed within said bracket the nose of said cam extending through a slot in the bracket, braking means housed within the drum and pivoted to said bracket so as to be acted on by the nose of said cam, a stop for the cam carried by the bracket, and a cover plate lying over the carrier plate to close off the opening into the drum.

3. In combination with a vehicle wheel having a brake drum and a spindle supported by an axle, a carrier plate fitting around and fastened to the axle end of the spindle and extending above the spindle, a one piece bracket fastened to the extended portion of said plate and having a part shouldered against the plate and protruding through it, said protruding part being arcuately formed for a cover bearing, said bracket having an arcuate slot therein transverse to its longitudinal axis, a universal joint including a cam shaft housed within said bracket so a cam on the shaft will lie in said slot, braking means housed within the drum and pivoted to said bracket so as to be acted on by the cam, a stop for limiting the movement of the cam carried by the bracket, and a cover plate closing the drum opening.

4. In combination with a vehicle wheel having a brake drum and a spindle supported by an axle, said spindle having a flat surface at its axle end, a carrier plate fitting over the axle end of the spindle and a cover plate for closing off the opening into the drum, both plates being fastened to the flat surface of the spindle, said carrier plate having an opening in its upper part, a one piece bracket shouldering around said opening and extending through both plate and cover, a universal joint housed by the extended part of the bracket, said joint including a cam shaft having a cam projecting through the wall of the inner end of the bracket, braking means housed within the drum and pivoted to said bracket so as to be acted on by said cam, and a stop carried by the bracket to limit the movement of said cam.

5. In combination with a vehicle wheel having a brake drum and a spindle supported by an axle, said spindle having a flat surface at its axle end, a punched carrier plate having a circular opening fitting over the axle end of the spindle and a punched cover plate for closing off the opening into the drum, both plates being bolted to said flat surface by the same bolts, and both said plates in their upper portions having smaller circular openings in alignment, a one piece bracket shouldered around said smaller openings in both plates and extending therethrough and fastened thereto, a universal joint completely housed in the extended part of the bracket, a cam shaft forming a part of said joint supported by the bracket, a cam on the shaft and braking means housed within the drum and operatively attached to said bracket so as to be acted on by said cam.

6. In combination with a vehicle wheel having a brake drum and a spindle supported by an axle, a carrier plate fitting around and fastened to the axle end of the spindle and extending above the spindle, a bracket fastened to said extended portion of the plate and having a part protruding through the plate beyond the drum, said bracket having a pair of spaced arms one of which engages the surface of the carrier plate, a universal joint housed within the protruding part of the bracket; a cam shaft, forming a part of said joint supported by the bracket; a cam on the shaft, braking means mounted between the arms of the bracket and extending to a position to be engaged by said cam, a stop on the bracket for limiting the movement of said cam, and a cover plate fitting over the bracket and spindle, and closing off the drum opening.

7. In combination with a vehicle wheel having a brake drum and a wheel spindle supported by an axle, a carrier plate fitting around and fastened to the axle end of the spindle and extending above the spindle, a one-piece bracket having bolt holes to fasten it to said carrier plate and having a part projecting through the plate, said bracket having a longitudinal bore with a lubricating groove therein and a lubricating passage connecting said groove to one of said bolt holes, a combined lubricator and stud in said one hole forming one point of attachment to said carrier plate, said bracket having a pair of spaced arms one of which rests against the carrier plate, braking means positioned between said arms and supported on a bolt passing through the arms and plate, a universal joint including a cam shaft positioned in the said bore of the bracket, said bracket having a slot intercepting said bore, a cam on said shaft positioned in said slot and adapted to actuate said braking means, a stop on the bracket for limiting the movement of the cam and a cover plate fitting over the protruding end of the bracket and over the carrier plate as described.

8. In combination with a vehicle wheel having a brake drum and a spindle supported by an axle, a carrier plate fitting around and fastened to the axle end of the spindle and extending above the spindle, a one piece bracket fastened to said extended portion of the plate and having a part protruding through the plate beyond the drum, a universal joint including a cam shaft housed within the bracket, means for lubricating the joint and shaft, a cam on the shaft having a part extending through the wall of the bracket and braking means movably attached to the bracket within the confines of the drum and extending into engagement with said cam.

9. In combination with a vehicle wheel having a brake drum and a spindle supported by an axle, a one piece carrier bracket housing a universal joint including a cam shaft carrying a cam, braking means, adapted to act on the drum, movably connected to said bracket and extending into operative relationship with said cam and a support for the bracket fastened to the axle end of the spindle.

10. In combination with a vehicle wheel, having a brake drum and a spindle supported by an axle, a one piece carrier bracket carrying a universal joint including cam actuating means, braking means, adapted to act on the drum, movably connected to said bracket and extending into operative relationship with said cam, and a support for the bracket fastened to said spindle.

11. In combination with a vehicle wheel having a brake drum and a spindle supported by an axle, a one piece carrier bracket carrying a universal joint including cam actuating means, braking means, adapted to act on the drum, movably connected to said bracket and extending into operative relationship with said cam, and a punched carrier plate having an orifice therein to fit around the axle end of said spindle and another orifice for receiving said bracket with means for holding the plate to the spindle, and further means for holding the bracket to the plate.

12. In combination with a vehicle wheel having a brake drum and a spindle supported by an axle, a one piece carrier bracket carrying a universal joint including cam actuating means, braking means, adapted to act on the drum, movably connected to said bracket and extending into operative relationship with said cam, a punched carrier plate having an orifice therein to fit around the axle end of said spindle and another orifice for receiving said bracket with means for holding the plate to the spindle and further means for holding the bracket to the plate, and a punched cover plate over the drum opening having similar orifices and the same holding means as said carrier plate.

13. In combination with a vehicle wheel having a brake drum and a spindle supported by an axle, a one piece carrier bracket carrying a universal joint including cam actuating means, braking means, adapted to act on the drum, movably connected to said bracket and extending into operative relationship with said cam, and a punched carrier plate having an orifice therein to fit around the axle end of said spindle and another orifice for receiving said bracket with means for holding the plate to the spindle, and further means for holding the bracket to the plate, a part of said holding means for the bracket acting as the connecting means of the braking means to the bracket.

14. In combination with a vehicle wheel having a brake drum and a spindle supported by an axle, a one piece carrier bracket carrying a universal joint including cam actuating means, braking means, adapted to act on the drum, movably connected to said bracket and extending into operative relationship with said cam, and a punched carrier plate having an orifice therein to fit around the axle end of said spindle and another orifice for receiving said bracket with means for holding the plate to the spindle and further means for holding the bracket to the plate, a part of said holding means for the bracket acting as the connecting means of the braking means to the bracket, and a further part of the holding means acting as means for supplying lubricant to the parts inside the bracket.

15. In combination with a vehicle wheel having a brake drum and a spindle supported by an axle, a one piece carrier bracket carrying a universal joint including cam actuating means, braking means, adapted to act on the drum, movably connected to said bracket and extending into operative relationship with said cam, and a punched carrier plate having an orifice therein to fit around the axle end of said spindle and another orifice for receiving said bracket with means for holding the plate to the spindle and further means for holding the bracket to the plate, and further orifices in the carrier plate whereby the same plate may be used to mount the bracket in either of two positions for right or left wheels.

16. In combination with a vehicle wheel having a brake drum and a spindle supported by an axle, a one piece carrier bracket carrying a universal joint including cam actuating means, braking means, adapted to act on the drum, movably connected to said bracket and extending into operative relationship with said cam and a punched carrier plate having an orifice therein to fit around the axle end of said spindle and another orifice for receiving said bracket with means for holding the plate to the spindle and further means for holding the bracket to the plate, and further orifices in the carrier plate for attaching brake tensioning and positioning devices.

17. In combination with a vehicle wheel having a brake drum and a spindle supported by an axle, a one piece carrier bracket carrying a universal joint including cam actuating means, braking means, adapted to act on the drum, movably connected to said bracket and extending into operative relationship with said cam, and a punched carrier plate having an orifice therein to fit around the axle end of said spindle and another orifice for receiving said bracket with means for holding the plate to the spindle and further means for holding the bracket to the plate, and further orifices in the carrier plate whereby the same plate may be used to mount the bracket in either of two positions for right or left wheels, and still further orifices in said carrier plate for attaching brake regulating devices.

18. As a means for applying brakes to a vehicle wheel drum, the combination of a carrier plate fitting over and fastened to the wheel spindle and a one piece carrier bracket detachably fastened to the plate, said plate having points of attachment for brake regulating devices and said bracket pivotally supporting the brakes and also carrying the brake actuating means.

19. As a means for applying brakes to a vehicle wheel drum, the combination of a carrier plate fitting over and fastened to the wheel spindle and a one piece carrier bracket detachably fastened to the plate, said plate having points of attachment for brake regulating devices and said bracket pivotally supporting the brakes and also carrying the brake actuating means, a cover plate fitting around the bracket and spindle and over the carrier plate for closing the drum opening.

20. In combination with a vehicle wheel having a brake drum and a spindle attached to an axle by a pivot pin, a carrier plate fitting around and fastened to that part of the spindle carrying said pin, a bracket fastened to said plate and having a part protruding through the plate, a universal joint including a shaft with a cam attached thereto housed within the bracket, braking devices pivoted to said bracket so as to be actuated by said cam, a cover plate lying over the carrier plate and a cap positioned on the spindle over the pivot pin, said cap having a flange lapping over the carrier plate and cover for the purpose described.

In testimony whereof, I affix my signature.

ADIEL Y. DODGE.